(12) United States Patent
Tsukaoka

(10) Patent No.: US 6,816,763 B2
(45) Date of Patent: Nov. 9, 2004

(54) CONTROL DEVICE OF AUXILIARY APPARATUS FOR VEHICLE

(75) Inventor: Hideki Tsukaoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/322,650

(22) Filed: Dec. 19, 2002

(65) Prior Publication Data

US 2004/0054454 A1 Mar. 18, 2004

(30) Foreign Application Priority Data

Sep. 17, 2002 (JP) ..................................... P2002-270249

(51) Int. Cl.$^7$ .............................................. G06F 7/00
(52) U.S. Cl. ...................................................... 701/36
(58) Field of Search ............................... 701/36, 49, 93, 701/96

(56) References Cited

U.S. PATENT DOCUMENTS 5,249,157 A * 9/1993 Taylor ........................ 340/903
5,672,946 A    9/1997 Kawashima et al.
6,032,097 A * 2/2000 Iihoshi et al. ................. 701/96

FOREIGN PATENT DOCUMENTS

JP           03099957 A * 4/1991
JP           2001-213228    8/2001

* cited by examiner

*Primary Examiner*—Yonel Beaulieu
(74) *Attorney, Agent, or Firm*—Sughrue Mion, PLLC

(57) ABSTRACT

An auxiliary apparatus for one's vehicle, in which when it is detected that a vehicle ahead starts moving and when a vehicle speed detector detects that one's vehicle is stopped, the control device controls a peripheral recognition assist apparatus such as wiper or a headlight, and a peripheral recognition apparatus such as an active sensor of a near-infrared camera, so as to come under a state suitable for traveling immediately.

13 Claims, 7 Drawing Sheets

CONTROL DEVICE OF AUXILIARY APPARATUS FOR VEHICLE

BACKGROUND OF THE INVENTION

1. Field of the Invention

The present invention relates to a control device of auxiliary apparatus for vehicle that controls vehicle auxiliary apparatus including peripheral recognition assist means such as a wiper, a headlight or the like, and peripheral recognition means such as an active sensor.

2. Description of the Related Arts

Hitherto, a device for controlling a wiper in accordance with a traveling state of a vehicle has already been put into practical use, as is disclosed in, for example, the Japanese Patent Publication (unexamined) No. 192724/1996.

Likewise a device for controlling a headlight is disclosed in the Japanese Patent Publication (unexamined) No. 213228/2001.

In the conventional technique of wiper control, which is described in the Japanese Patent Publication No. 192724/1996, the device is arranged so as to drive the wiper immediately upon detecting the fact that one's vehicle incorporating the control device therein has started. Thus, while achieving an object of an intermittent wiper sensitive to a vehicle speed which object is not to drive the wiper more than required, a sufficiently wide visual range can be assured at the time of starting the vehicle.

Furthermore, in the conventional technique of headlight control, which is described in the Japanese Patent Publication No. 213228/2001, it is arranged so as to cause the headlight to light when vehicle speed of one's vehicle exceeds a second vehicle speed threshold, which is lower than a first vehicle speed threshold, as well as when an acceleration state of the vehicle exceeds a predetermined acceleration threshold. Thus, in the case where the vehicle is accelerated in order to transit from a stop state to a normal speed traveling state, a basic headlight is automatically turned on even if the vehicle travels at a low speed. Whereas the basic headlight is controlled so as not to be turned on automatically in the state of the vehicle being inched along, thus preventing the headlight from being turned ON/OFF at frequent intervals in the state of the vehicle inching along a clogged road.

However, in the mentioned conventional techniques, a problem exists in that the wiper or headlight does not return to a normal operation until one's vehicle starts moving, in the case where the wiper is operated at intermittent intervals, or the headlights are dimmed during stopping one's vehicle, thereby inviting a difficulty in seeing around.

SUMMARY OF THE INVENTION

The present invention was made to solve the above-discussed problem, and has an object of providing a control device of auxiliary apparatus for vehicle that is arranged so as to control vehicle auxiliary apparatus including peripheral recognition assist means such as a wiper or headlight and peripheral recognition means into a normal operation upon detecting that an other's vehicle ahead starts moving during one's vehicle being stopped, thereby making it easy to see around before starting a travel, and enabling an immediate travel motion.

A control device of auxiliary apparatus for vehicle according to the invention includes: vehicle speed detection means for detecting a vehicle speed of one's vehicle; vehicle-ahead start detection means for detecting a start of an other's vehicle ahead when it is detected by the mentioned vehicle speed detection means that the one's vehicle is stopped; and control means for controlling peripheral recognition assist means for assisting a driver to easily recognize around the driver's vehicle and/or peripheral recognition means constituted so as to recognize the surroundings of the driver's vehicle;

in which the mentioned control means controls the mentioned peripheral recognition assist means and/or the mentioned peripheral recognition means to come under suitable conditions for traveling when it is detected by the mentioned vehicle-ahead start detection means that the mentioned vehicle ahead starts moving.

As a result of employing the arrangement as described above, when it is detected by the vehicle-ahead start detection means that the vehicle ahead starts moving, the control means can control the peripheral recognition assist means and/or the peripheral recognition means to come under the suitable conditions for traveling, and provide the conditions of the one's vehicle being capable of immediately starting.

The foregoing and other object, features, aspects and advantages of the present invention will become more apparent the following detailed description of the present invention when taken in conjunction with the accompanying drawings.

DESCRIPTION OF THE PREFERRED EMBODIMENT

Embodiment 1

Hereinafter, a control device of auxiliary apparatus for vehicle according to a first preferred embodiment of the present invention is described referring to the accompanying drawings.

Figure 1:
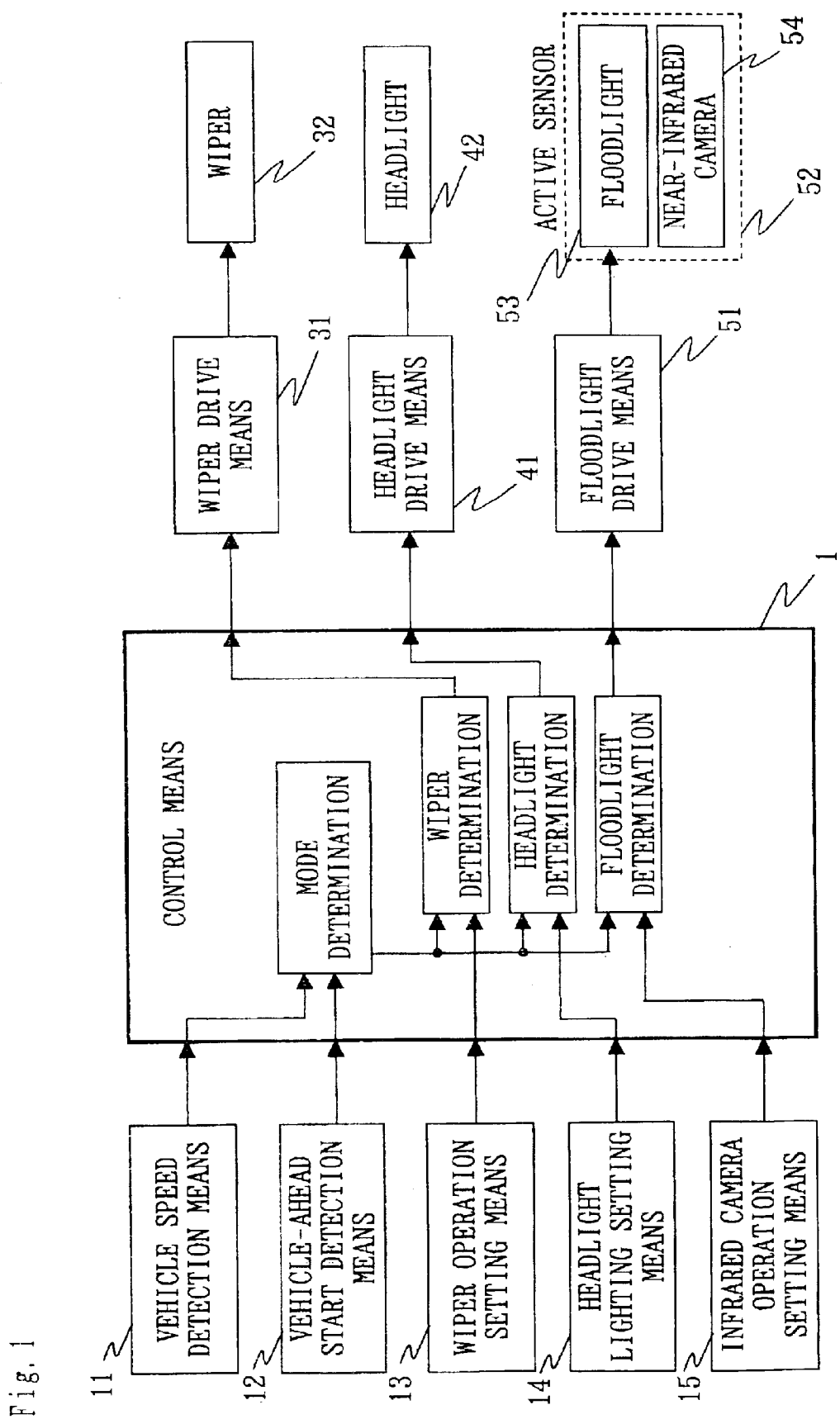
FIG. 1 is a block diagram showing a control device of auxiliary apparatus for vehicle according to a first preferred embodiment of the present invention.

FIG. 1 is a block diagram showing a control device of auxiliary apparatus for vehicle according to the first embodiment of this invention.

With reference to FIG. 1, reference numeral 1 designates control means for controlling vehicle auxiliary apparatus including peripheral recognition assist means such as a wiper or a headlight, and peripheral auxiliary means such as an active sensor. Numeral 11 designates vehicle speed detection means for detecting a vehicle speed of one's vehicle with the use of, e.g., a vehicle speed sensor. Numeral 12 designates vehicle-ahead start detection means using, e.g., an image sensor or ultrasonic wave, and this vehicle-ahead start detection means 12 operates when one's vehicle is stopped. Numeral 13 designates wiper operation setting means such as a switch or a volume switch for setting an operation speed or an intermittent time period of the wiper. Numeral 14 designates headlight lighting setting means such as a switch or volume switch for performing ON/OFF of the headlight. Numeral 15 designates infrared camera operation setting means such as a switch for setting the operation of a near-infrared camera. Numeral 31 designates wiper drive means, and numeral 32 designates a wiper. Numeral 41 designates headlight drive means, and numeral 42 designates a headlight. Numeral 51 designates floodlight drive means, and numeral 52 designates an active sensor consisting of a floodlight 53 and a near-infrared camera 54.

Figure 2:
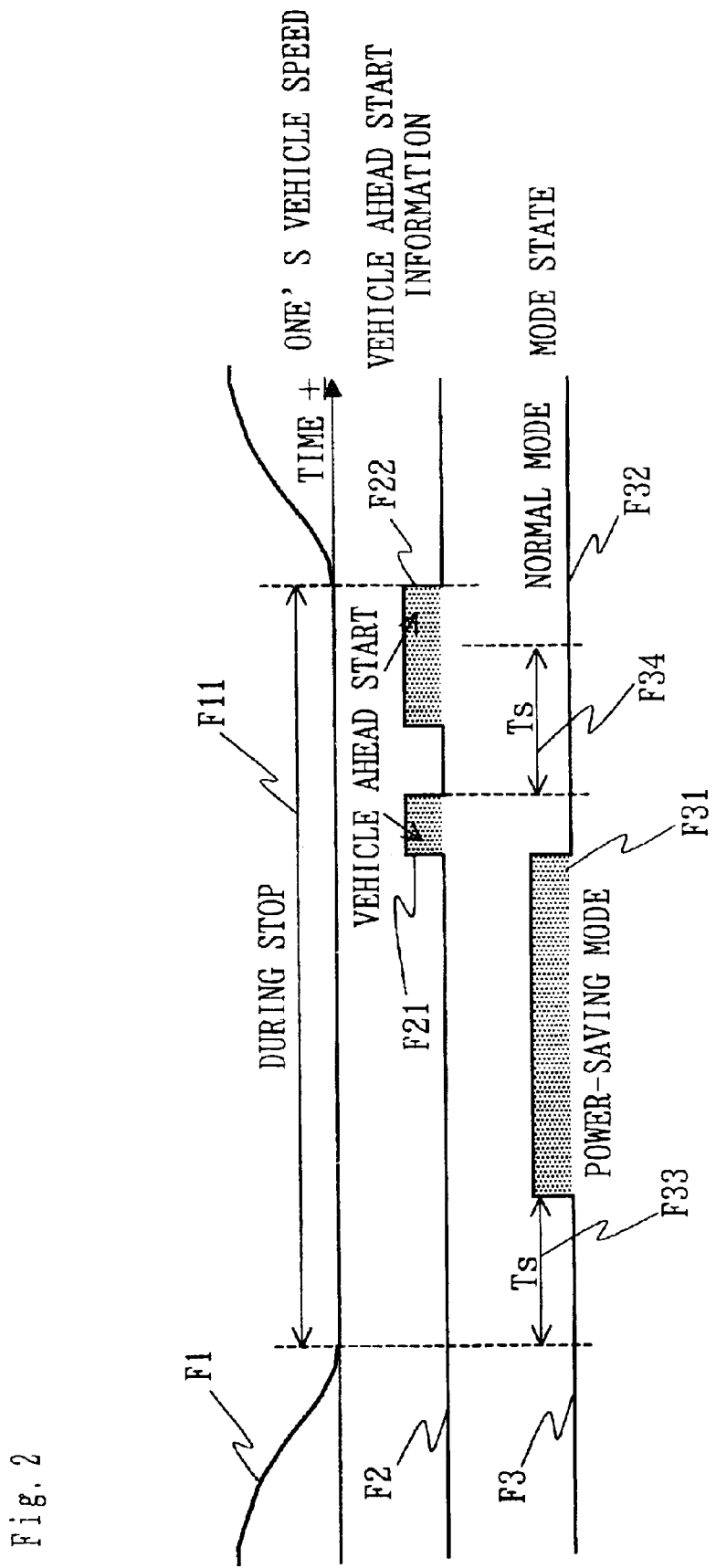
FIG. 2 is an operation waveform chart showing the manner of determining a mode of the control device by the vehicle auxiliary apparatus according to the first embodiment of the invention.

FIG. 2 is an operation waveform chart showing the manner of determining a mode by the control device of auxiliary apparatus for vehicle according to the first embodiment of the invention.

With reference to FIG. 2, F1 indicates a one's vehicle speed obtained from the vehicle speed detection means 11. F11 indicates a state that the one's vehicle is stopped. F2 indicates a start state of a vehicle ahead obtained from the vehicle-ahead start detection means 12. F21 indicates that the start of the vehicle ahead is under detection. F3 indicates a mode state determined in the step of mode determination. F31 indicates a power-saving mode. F32 indicates a normal mode. F33 indicates a predetermined time period TS. F34 indicates a predetermined time period TS.

Now, referring to FIG. 2 and the flowcharts of FIGS. 3 to 7, operations are described.

Figure 3:
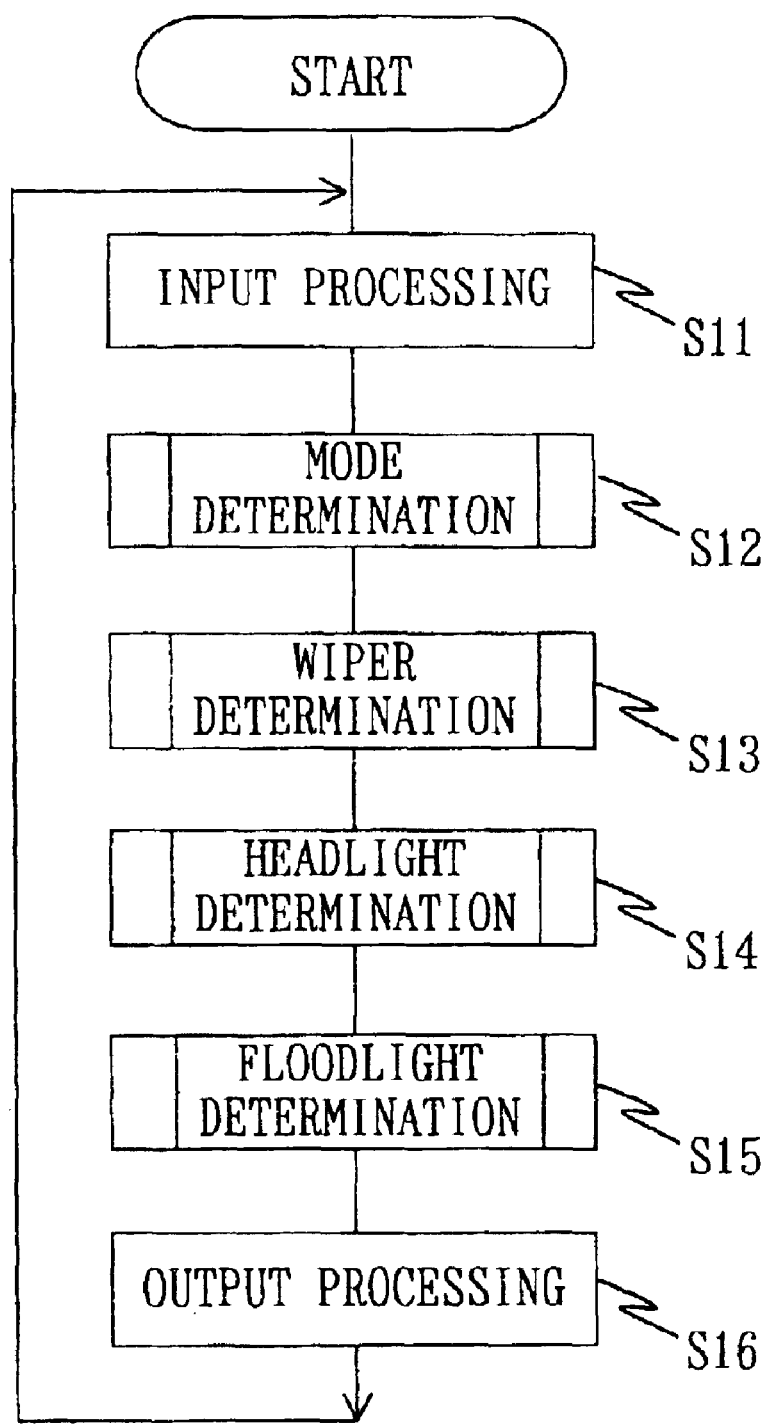
FIG. 3 is a flowchart showing a processing of the control device of auxiliary apparatus for vehicle according to the first embodiment of the invention.

FIG. 3 is a flowchart showing an overall processing content of the control means 1 including an input processing step S11, a mode determination step S12, a wiper determination step S13, a headlight determination step S14, a floodlight, determination step S15, and an output processing step S16. The steps are hereinafter described in sequential order respectively.

In the input processing step S11, signals are received from the vehicle speed detection means 11, the vehicle-ahead start detection means 12, the wiper operation setting means 13, the headlight lighting setting means 14 and the infrared camera operation setting means 15.

Then, in the mode determination step S12, whether it is a power-saving mode or a normal mode is determined depending upon a vehicle speed and a start state of the vehicle ahead obtained in the input processing step S11. This determination is conducted as follows.

An operation waveform in FIG. 2 shows a manner of mode determination.

When one's vehicle speed comes to be 0 km/h, in other words, one's vehicle is stopped (F11), the operation proceeds to a power-saving mode (F31) after a predetermined time period TS (F33) has passed. The predetermined time period TS can be obtained by way of experiment, and is set to be, for example, three seconds.

When the start of the vehicle ahead (F21) is detected while one's vehicle is being stopped, the operation immediately returns to the normal mode (F32). Even if the start of the vehicle ahead is once stooped thereafter, the operation holds the normal mode for a predetermined time period TS (F34). This operation waveform shows that the start of the vehicle ahead is detected again, and therefore, the normal mode continues as it is.

Further, even if the start of the vehicle ahead is not detected, the operation returns to the normal mode upon start of the one's vehicle.

Figure 4:
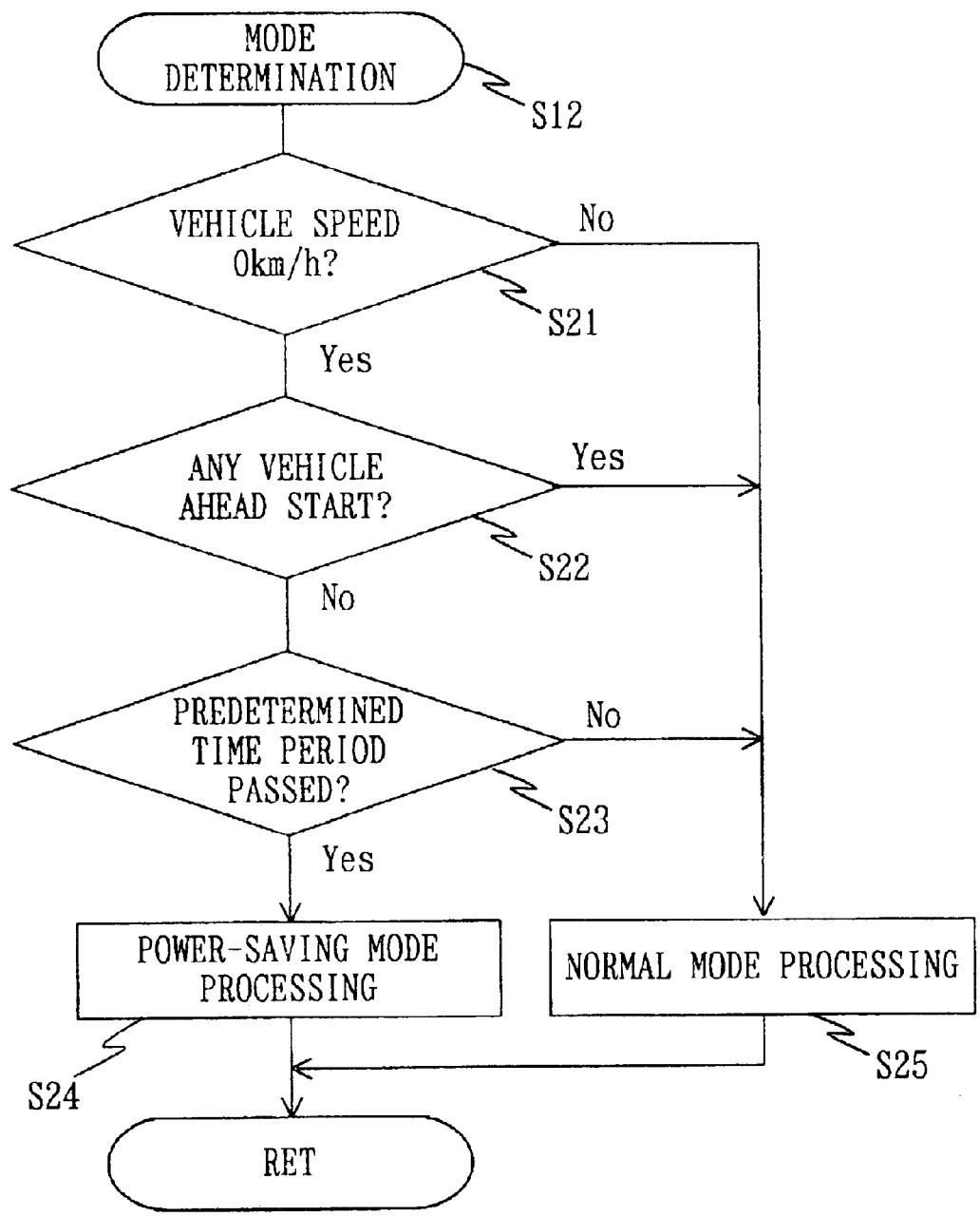
FIG. 4 is a flowchart showing the manner of determining a mode of the control device of auxiliary apparatus for vehicle according to the first embodiment of the invention.

FIG. 4 is a flowchart showing the mode determination. In Step S21, it is determined whether or not one's vehicle speed is 0 km/h, in other words, one's vehicle is stopped. Furthermore, when the start of the vehicle ahead is not detected in Step S22 and it is determined in Step S23 that a predetermined time period TS has passed in the state that the start of the vehicle ahead is not detected, the operation proceeds to the power-saving mode S24.

In the case where either of the above-mentioned conditions is not satisfied, the operation proceeds to the normal mode S25.

In the mode determination step S12, operations of the wiper 32, the headlight 42 and the floodlight 53 for infrared camera are determined based on a mode state determined and contents set by the setting means 13 to 15.

In the wiper determination step S13 (referring to FIG. 5), in the case of the normal, the wiper is controlled so as to operate as set by the wiper operation setting means.

In the case of the power-saving mode, the wiper is controlled so as to operate at intermittent intervals.

Figure 5:
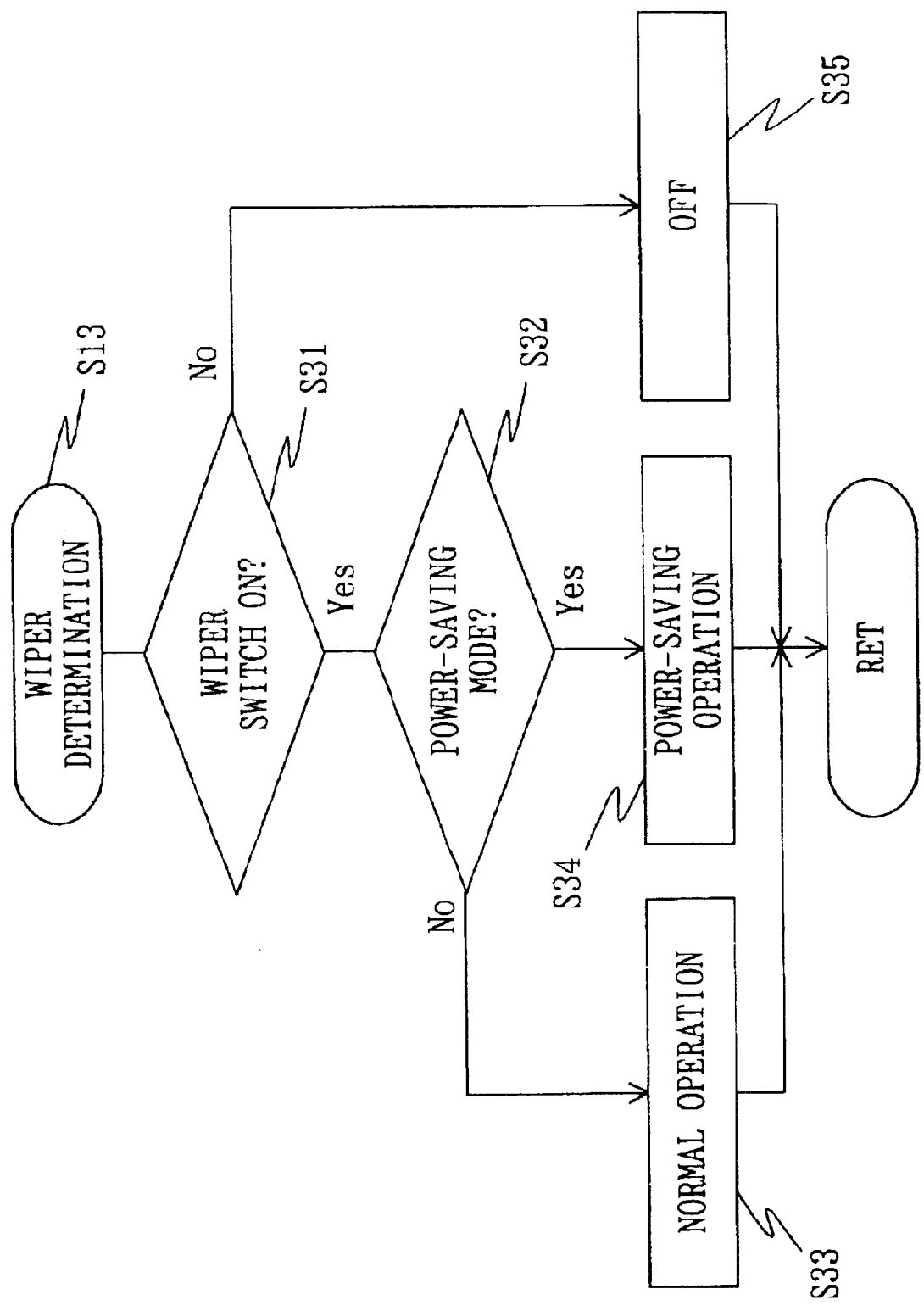
FIG. 5 is a flowchart showing the manner of determining a wiper by the control device for auxiliary apparatus according to the first embodiment of the invention.

FIG. 5 is a flowchart showing the wiper determination. In Step S31, it is determined whether a wiper switch is ON or OFF. In the case of ON, it is determined in Step 32 whether or not it is a power-saving mode. In the case of the power-saving mode, a power-saving operation is conducted in Step S34. In the case where it is not the power-saving mode, a normal operation is conducted in Step S33. In the case where the wiper switch is not ON in Step 31, the wiper is brought into OFF in Step S35.

Likewise, in the headlight determination step S14 (referring to FIG. 6) and the floodlight determination Step S15 (referring to FIG. 7), in the case of the normal mode, the headlight and the floodlight of the infrared camera is controlled so as to operate as set by the headlight lighting setting means and the infrared camera operation setting means respectively. In the case of the power-saving mode, the headlight is controlled so as to dim, and the floodlight for the infrared camera is controlled so that an output thereof may be reduced.

Figure 6:
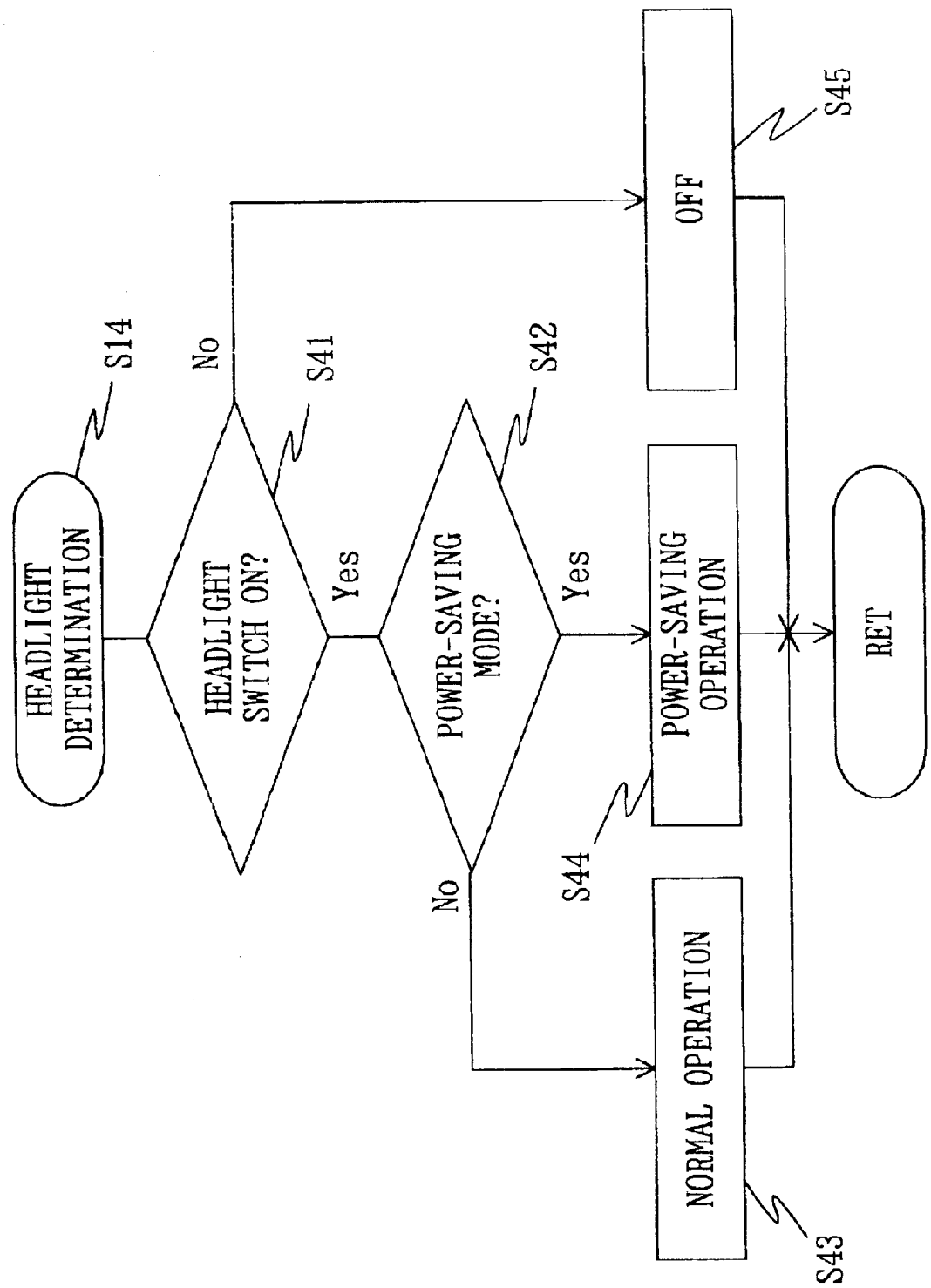
FIG. 6 is a flowchart showing the manner of determining a headlight by the control device of auxiliary apparatus for vehicle according to the first embodiment of the invention.

FIG. 6 is a flowchart showing the headlight lighting determination. In Step S41, it is determined whether a headlight switch is ON or OFF. In the case of ON, it is determined in Step S42 whether or not it is the power-saving mode. In the case of the power-saving mode, the power-saving operation is conducted in Step S44. In the case where it is not the power-saving mode, the normal operation is conducted in Step S43. In the case where the headlight switch is not ON in Step S41, the headlight is brought into OFF in Step S45.

Figure 7:
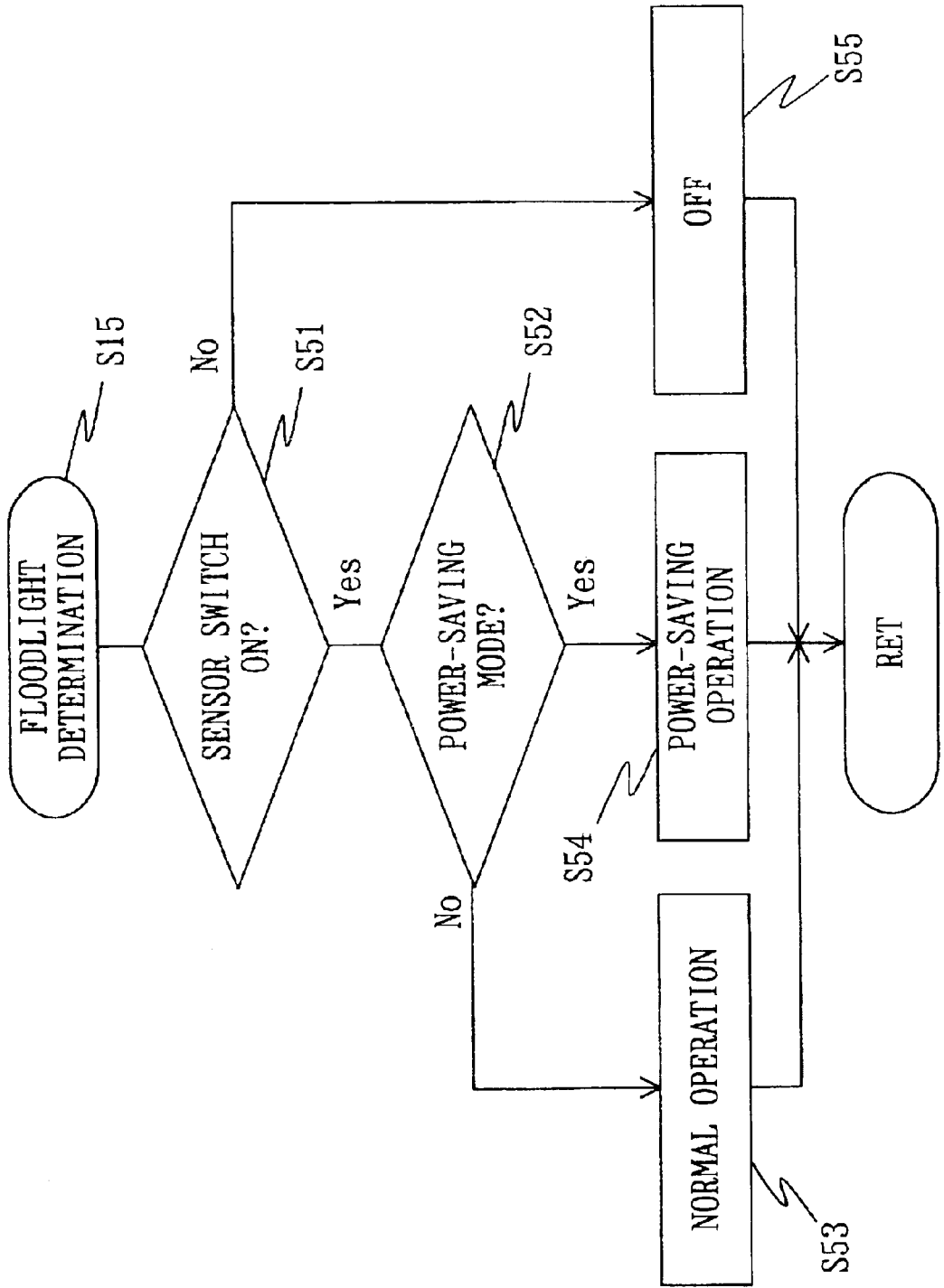
FIG. 7 is a flowchart showing the manner of determining a floodlight by the control device of auxiliary apparatus for vehicle according to the first embodiment of the invention.

FIG. 7 is a flowchart showing this floodlight determination. In Step S51, it is determined whether a sensor switch is ON or OFF. In the case of ON, it is determined in Step 52 whether or not it is the power-saving mode. In the case of the power-saving mode, the power-saving operation is conducted in Step S54. In the case where it is not the power-saving mode, the normal operation is conducted in Step S53. In the case where the sensor switch is not ON in Step S51, the floodlight of the infrared camera is brought in OFF.

In the output processing Step S16, control signals are outputted to the wiper drive means 31, the headlight drive means 41 and the floodlight drive means 51 based on respective results of determination.

The control means 1 is arranged so as to repeat the steps described above.

In addition, the wiper, the headlight and the infrared camera floodlight are employed as the peripheral recognition assist means and peripheral recognition means in the above descriptions. It is, however, also preferable that other means such as laser radar or millimeter wave radar is employed.

Further, it is also preferable that a return switch is provided so that a driver can return the operation to the normal mode freely whenever a driver intends to return the operation thereto.

In the foregoing first embodiment, when detecting that a vehicle ahead starts moving at the time of one's vehicle being stopped, the peripheral recognition assist means such as headlight or wiper, and the peripheral recognition means such as active sensor can be controlled so as to be suitable for traveling. Accordingly, the one's vehicle can be brought into a state of being able to start immediately.

Furthermore, the control means controls the operation so as to hold the suitable state for traveling during a predetermined time period after detecting by the vehicle speed detection means that the one's vehicle is stopped, as well as coming under a state that start of the vehicle ahead is not detected by the vehicle-ahead start detection means. Therefore, even when the vehicle ahead stops for a moment, the suitable state for traveling can be held.

What is claimed is:

1. A control device of an auxiliary apparatus for a driver's vehicle comprising:
   vehicle speed detection means for detecting a vehicle speed of the driver's vehicle;
   vehicle-ahead start detection means for detecting a start of a vehicle ahead of the driver's vehicle, when it is detected by the vehicle speed detection means that the driver's vehicle is stopped; and
   control means for controlling a peripheral recognition assist means for assisting a driver to easily view the surroundings of the driver's vehicle;
   wherein said control means controls said peripheral recognition assist means to operate under suitable conditions for traveling when it is detected by said vehicle-ahead start detection means that said vehicle ahead of the driver's vehicle starts moving.

2. The control device of auxiliary apparatus for vehicle according to claim 1, wherein even where said vehicle-ahead start detection means does not detect the start of the vehicle ahead of the driver's vehicle, said control means controls said peripheral recognition assist means to operate under suitable conditions for traveling during a predetermined time period after said vehicle speed detection means detects that the driver's vehicle is stopped.

3. The control device of auxiliary apparatus for vehicle according to claim 1, wherein said peripheral recognition assist means is a headlight.

4. The control device of auxiliary apparatus for vehicle according to claim 1, wherein said peripheral recognition assist means is a wiper.

5. The control device of auxiliary apparatus for vehicle according to claim 1, wherein said peripheral recognition means is an active sensor including a near-infrared camera and a floodlight.

6. A driver assist system for a driver's vehicle comprising:
   an auxiliary driver assist device that operates under suitable modes during traveling; and
   a control circuit,
   wherein, when the control circuit detects that a driver's vehicle has stopped movement, the control circuit detects whether a start of movement of a vehicle ahead of the driver's vehicle has occurred;
   wherein the control circuit operates the driver assist device in a power-saving mode of operation after a predetermined time period has passed since the driver's vehicle has stopped;
   wherein the control circuit switches the driver assist device to a normal mode of operation for a predetermined period of time when the start of movement of the vehicle ahead of the driver's vehicle is detected.

7. The driver assist system for a driver's vehicle according to claim 6, wherein the driver assist device is a wiper.

8. The driver assist system for a driver's vehicle according to claim 7, wherein the wiper is controlled so as to operate at intermittent intervals in the power-saving mode.

9. The driver assist system for a driver's vehicle according to claim 6, wherein the driver assist device is a headlight.

10. The driver assist system for a driver's vehicle according to claim 9, wherein the headlight is controlled so as to dim in the power-saving mode.

11. The driver assist system for a driver's vehicle according to claim 6, wherein the driver assist device is a floodlight.

12. The driver assist system for a driver's vehicle according to claim 11, wherein the floodlight is controlled so as to dim in the power-saving mode.

13. A vehicle control system, comprising:
   control means for controllably powering-down selected peripheral components of the vehicle after detection that the vehicle has stopped moving; and
   a detector for detecting movement of a second vehicle located forward of said vehicle,
   wherein said control means controllably powers-up said selected peripheral components when said detector detects movement of said second vehicle.

* * * * *